US011244306B2

(12) United States Patent
Zhang et al.

(10) Patent No.: US 11,244,306 B2
(45) Date of Patent: Feb. 8, 2022

(54) METHOD, APPARATUS AND ELECTRONIC DEVICE FOR BLOCKCHAIN TRANSACTIONS

(71) Applicant: ADVANCED NEW TECHNOLOGIES CO., LTD., Grand Cayman (KY)

(72) Inventors: Wenbin Zhang, Hangzhou (CN); Lichun Li, Hangzhou (CN); Baoli Ma, Hangzhou (CN); Zheng Liu, Hangzhou (CN); Shan Yin, Hangzhou (CN)

(73) Assignee: ADVANCED NEW TECHNOLOGIES CO., LTD., George Town (KY)

( * ) Notice: Subject to any disclaimer, the term of this patent is extended or adjusted under 35 U.S.C. 154(b) by 81 days.

(21) Appl. No.: 16/531,476

(22) Filed: Aug. 5, 2019

(65) Prior Publication Data

US 2020/0042994 A1 Feb. 6, 2020

(30) Foreign Application Priority Data

Aug. 6, 2018 (CN) .......................... 201810886845.3

(51) Int. Cl.
*G06Q 20/00* (2012.01)
*G06Q 20/36* (2012.01)
(Continued)

(52) U.S. Cl.
CPC ..... *G06Q 20/3676* (2013.01); *G06Q 20/3674* (2013.01); *G06Q 20/425* (2013.01); *H04L 9/008* (2013.01); *H04L 9/0637* (2013.01)

(58) Field of Classification Search
CPC .......... G06Q 20/3676; G06Q 20/3674; G06Q 20/425; G06Q 40/04; H04L 9/0637;
(Continued)

(56) References Cited

U.S. PATENT DOCUMENTS 7,568,615 B2 8/2009 Corona et al.
9,569,771 B2 2/2017 Lesavich et al.
(Continued)

FOREIGN PATENT DOCUMENTS

CN 106549749 A 3/2017
CN 106845960 A 6/2017
(Continued)

OTHER PUBLICATIONS

Preinterview first office action for U.S. Appl. No. 16/870,662 dated Jul. 24, 2020.
(Continued)

*Primary Examiner* — Dante Ravetti (57) ABSTRACT

Embodiments of the application provide a method, apparatus, and electronic device for implementing blockchain-based transactions. The method comprises: determining a transaction amount to be remitted from a remitter's blockchain account into a receiver's blockchain account, wherein a commitment of the remitter's balance is recorded with the remitter's blockchain account in a blockchain, a commitment of the receiver's balance is recorded with the receiver's blockchain account in the blockchain; obtaining a commitment of the transaction amount by using the homomorphic encryption algorithm according to the transaction amount; and submitting to the blockchain a transaction comprising information of the remitter's and the receiver's blockchain accounts, and the commitment of the transaction amount, for the commitment of the transaction amount to be deducted from the commitment of the remitter's balance and the commitment of the transaction amount to be added to the commitment of the receiver's balance.

20 Claims, 5 Drawing Sheets

(51) Int. Cl.
*G06Q 20/42* (2012.01)
*H04L 9/06* (2006.01)
*H04L 9/00* (2022.01)

(58) Field of Classification Search
CPC ... H04L 9/008; H04L 2209/38; H04L 9/3239; G06F 21/602
USPC .............................. 705/16, 21; 380/44, 262
See application file for complete search history.

(56) References Cited

U.S. PATENT DOCUMENTS

| | | |
|---|---|---|
| 9,774,578 B1 | 9/2017 | Ateniese et al. |
| 9,990,504 B1 | 6/2018 | Chapman et al. |
| 10,022,613 B2 | 7/2018 | Tran et al. |
| 10,057,255 B2 | 8/2018 | Votaw et al. |
| 10,148,646 B2 | 12/2018 | Votaw et al. |
| 10,163,080 B2 | 12/2018 | Chow et al. |
| 10,262,351 B2 | 4/2019 | Boemi et al. |
| 10,270,599 B2 | 4/2019 | Nadeau et al. |
| 10,275,739 B2 | 4/2019 | Hanis et al. |
| 10,333,706 B2 | 6/2019 | Smith et al. |
| 10,339,523 B2 | 7/2019 | Mcdonough et al. |
| 10,615,960 B2 | 4/2020 | Zhang et al. |
| 10,817,872 B2 | 10/2020 | Lin |
| 11,080,665 B1 | 8/2021 | Poelstra et al. |
| 2004/0260926 A1 | 12/2004 | Arditti Modiano et al. |
| 2009/0136033 A1 | 5/2009 | Sy |
| 2010/0078471 A1 | 4/2010 | Lin et al. |
| 2013/0073432 A1 | 3/2013 | Mulholland |
| 2013/0230168 A1 | 9/2013 | Takenouchi |
| 2013/0238491 A1 | 9/2013 | Bouey et al. |
| 2013/0254098 A1 | 9/2013 | Holland |
| 2014/0334622 A1 | 11/2014 | Smyth et al. |
| 2015/0088756 A1 | 3/2015 | Makhotin et al. |
| 2015/0333905 A1 | 11/2015 | Parann-nissany et al. |
| 2016/0078431 A1 | 3/2016 | Ramachandran et al. |
| 2016/0162897 A1 | 6/2016 | Feeney |
| 2016/0253663 A1 | 9/2016 | Clark et al. |
| 2016/0260160 A1 | 9/2016 | Cheng et al. |
| 2016/0261411 A1 | 9/2016 | Yau et al. |
| 2016/0275461 A1 | 9/2016 | Sprague et al. |
| 2016/0314462 A1 | 10/2016 | Hong et al. |
| 2016/0342978 A1 | 11/2016 | Davis et al. |
| 2016/0358165 A1 | 12/2016 | Maxwell |
| 2017/0046698 A1 | 2/2017 | Haldenby et al. |
| 2017/0048209 A1 | 2/2017 | Lohe et al. |
| 2017/0124483 A1 | 5/2017 | Huang |
| 2017/0149796 A1 | 5/2017 | Gvili |
| 2017/0154331 A1 | 6/2017 | Voorhees |
| 2017/0228822 A1 | 8/2017 | Creighton, IV et al. |
| 2017/0236123 A1 | 8/2017 | Ali et al. |
| 2017/0243241 A1 | 8/2017 | Boutelle et al. |
| 2017/0289111 A1 | 10/2017 | Voell et al. |
| 2017/0316479 A1 | 11/2017 | Kurian |
| 2017/0330179 A1 | 11/2017 | Song et al. |
| 2017/0364705 A1 | 12/2017 | Villars |
| 2017/0366357 A1 | 12/2017 | Pattanaik et al. |
| 2018/0041345 A1 | 2/2018 | Maim |
| 2018/0089644 A1 | 3/2018 | Chen et al. |
| 2018/0205555 A1 | 7/2018 | Watanabe et al. |
| 2018/0253702 A1 | 9/2018 | Dowding |
| 2018/0349894 A1 | 12/2018 | Patrinos et al. |
| 2018/0365688 A1 | 12/2018 | He et al. |
| 2018/0365691 A1 | 12/2018 | Sanders et al. |
| 2019/0005470 A1 | 1/2019 | Uhr et al. |
| 2019/0020629 A1 | 1/2019 | Baird, III et al. |
| 2019/0036712 A1 | 1/2019 | Qiu |
| 2019/0043043 A1 | 2/2019 | Saraniecki et al. |
| 2019/0044734 A1 | 2/2019 | Lancashire et al. |
| 2019/0080392 A1 | 3/2019 | Youb et al. |
| 2019/0164153 A1 | 5/2019 | Agrawal et al. |
| 2019/0182027 A1 | 6/2019 | Kipnis et al. |
| 2019/0228407 A1 | 7/2019 | Wu et al. |
| 2019/0236300 A1 | 8/2019 | Guo et al. |
| 2019/0280880 A1* | 9/2019 | Zhang .................. G06F 7/58 |
| 2019/0303621 A1 | 10/2019 | Baset et al. |
| 2019/0349190 A1 | 11/2019 | Smith et al. |
| 2019/0358515 A1 | 11/2019 | Tran et al. |
| 2019/0385162 A1 | 12/2019 | Zhang et al. |
| 2019/0386814 A1 | 12/2019 | Ahmed |
| 2019/0394019 A1 | 12/2019 | Gao |
| 2020/0028693 A1 | 1/2020 | Wu et al. |
| 2020/0097958 A1 | 3/2020 | Imoto |
| 2020/0150994 A1 | 5/2020 | Thompson et al. |
| 2021/0028939 A1 | 1/2021 | Trevethan |
| 2021/0081216 A1 | 3/2021 | Komarov et al. |
| 2021/0203476 A1 | 7/2021 | Van De et al. |

FOREIGN PATENT DOCUMENTS

| | | |
|---|---|---|
| CN | 106982205 A | 7/2017 |
| CN | 107294709 A | 10/2017 |
| CN | 103903129 B | 11/2017 |
| CN | 107360001 A | 11/2017 |
| CN | 107392603 A | 11/2017 |
| CN | 107666388 A | 2/2018 |
| CN | 107679976 A | 2/2018 |
| CN | 108009441 A | 5/2018 |
| CN | 108021821 A | 5/2018 |
| CN | 108335106 A | 7/2018 |
| CN | 108418689 A | 8/2018 |
| CN | 108418783 A | 8/2018 |
| CN | 108711105 A | 10/2018 |
| CN | 108764874 A | 11/2018 |
| CN | 109034840 A | 12/2018 |
| CN | 106549749 B | 12/2019 |
| EP | 3576033 A1 | 12/2019 |
| JP | 2018-007168 A | 1/2018 |
| RU | 2663476 C2 | 8/2018 |
| TW | 201830302 A | 8/2018 |
| TW | I631518 B | 8/2018 |
| WO | 2012/067214 A1 | 5/2012 |
| WO | 2016200885 A1 | 12/2016 |
| WO | 2017011601 A1 | 1/2017 |
| WO | 2017054985 A1 | 4/2017 |
| WO | 2017095833 A1 | 6/2017 |
| WO | 2017218983 A1 | 12/2017 |
| WO | 2018022132 A1 | 2/2018 |
| WO | 2018076762 A1 | 5/2018 |
| WO | 2018/137316 A1 | 8/2018 |
| WO | 2018/229631 A1 | 12/2018 |
| WO | 2018231397 A1 | 12/2018 |
| WO | 2019040855 A1 | 2/2019 |
| WO | 2019105407 A1 | 6/2019 |
| WO | 2020033296 A1 | 2/2020 |

OTHER PUBLICATIONS

Written Opinion for Singaporean Application No. 11201904629U dated Jul. 27, 2020.
Search Report for Taiwanese Application No. 108110705 dated Jan. 17, 2020.
Search Report for Taiwanese Application No. 108110708 dated Jan. 31, 2020.
Second Office Action for Chinese Application No. 201810886845.3 dated Dec. 10, 2019 with English machine translation (15 pages).
Supplementary Search for Chinese Application No. 201810886845.3 dated Dec. 2, 2019 (1 page).
Rectinajh, "Ethernet Square white book", Jianshu, retrieved from: https://www.jianshu.com/p/a4e32c50262a, Jan. 18, 2018, with English machine translation (52 pages).
First Examination Report for Australian Application No. 2018349940 dated Dec. 18, 2019 (4 pages).
Final Office Action for U.S. Appl. No. 16/870,662 dated Nov. 25, 2020.
Non-Final Office Action for U.S. Appl. No. 16/870,662 dated Mar. 22, 2021.
Final Office Action for U.S. Appl. No. 16/878,236 dated Mar. 16, 2021.
Wang et al., "Preserving transaction privacy in bitcoin, Future Generation Computer Systems," ScienceDirect, 2017.

(56) References Cited

OTHER PUBLICATIONS

Non-Final Office Action for U.S. Appl. No. 16/879,728 dated Feb. 2, 2021.
Office Action for Japanese Application No. 2019-528571 dated Sep. 8, 2020.
Yuki Yasusaka, et al., "A Privacy-preserving Pre-Consensus Protocol for Blockchain", Computer Security Symposium 2018 Proceedings, Information Processing Society of Japan, Oct. 15, 2018, pp. 850-856.
International Preliminary Report on Patentability for PCT Application No. PCT/US2019/045081 dated Oct. 16, 2020.
Preinterview first office action for U.S. Appl. No. 16/878,236 dated Jul. 22, 2020.
Bunz et al. ("Bulletproofs: Short Proof for Confidential Transactions and More", 45 pages, Jul. 1, 2018) (Year: 2018).
Second Examination Report for Australian Application No. 2018349940 dated May 22, 2020.
Office Action for Canadian Application No. 3044907 dated Jun. 4, 2020.
Search Report for European Application No. 18867008.7 dated Feb. 7, 2020.
Examination Report for European Application No. 18867008.7 dated Feb. 20, 2020.
Decision on Grant and Search Report for Russian Application No. 2019116029 dated Mar. 10, 2020.
Second Written Opinion for PCT Application No. PCT/US2019/045081 dated Mar. 18, 2020.
Supplementary Search Report for Chinese Application No. 201810886845.3 dated Mar. 23, 2020.
First Office Action for Chinese Application No. 201811003743.9 dated Feb. 3, 2020.
First Search Report for Chinese Application No. 201811003743.9 dated Jan. 19, 2020.
Second Office Action for Chinese Application No. 201811003743.9 dated Apr. 15, 2020.
Narula et al., "zkLedger: Privacy-Preserving Auditing for Distributed Ledgers", USENIX, Apr. 9, 2018.
Alonso et al., "Monero—Privacy in the Blockchain," IACR, May 31, 2018.
Poon et al., "The Bitcoin Lightning Network: Scalable Off-Chain Instant Payments," Jan. 14, 2016.
Written Opinion of the International Searching Authority and International Search Report for PCT Application No. PCT/CN2018/125749 dated Sep. 30, 2019 (6 pages).
Written Opinion of the International Searching Authority and International Search Report for PCT Application No. PCT/US2019/045081 dated Sep. 30, 2019 (16 pages).
Franca, "Homomorphic Mini-blockchain Scheme," Apr. 24, 2015, retrieved from: http://pdfs.semanticscholar.org/ab9f/b027061fb4aa8ed8017d63002f586a18eab6.pdf, retrieved on Sep. 20, 2019 (18 pages).
Sun et al., "RingCT 2.0: A Compact Accumulator-Based (Linkable Ring Signature) Protocol for Blockchain Cryptocurrency Monero," Aug. 12, 2017, International Conference on Computer Analysis of Images And Patterns, CAIP 2017: Computer Analysis of Images and Patterns, pp. 456-474 (20 pages).
Cecchetti et al., "Solidus: Confidential Distributed Ledger Transactions via PVORM," International Association For Cryptologic Research, Apr. 10, 2017 (28 pages).
Written Opinion of the International Searching Authority and International Search Report for PCT Application No. PCT/US2019/048667 dated Oct. 21, 2019 (13 pages).
Ma et al., "An Efficient NIZK Scheme for Privacy-Preserving Transactions over Account-Model Blockchain," IACR, International Association for Cryptologic Research, Dec. 22, 2017, retrieved from the internet: "http://eprint.iacr.org/2017/1239.pdf", retrieved on Dec. 22, 2017 (26 pages).
Non-Final Office Action for U.S. Appl. No. 16/879,728 dated May 24, 2021.
First Office Action and First Search for Chinese Application No. 201810886845.3 dated Jul. 31, 2019 (7 pages).
Final Office Action for U.S. Appl. No. 16/870,662 dated Aug. 3, 2021.
Notice of Allowance for U.S. Appl. No. 16/870,662 dated Dec. 10, 2021.
Liubin "Online Dispute Resolution in Russia and Europe-Current Situation and Prospects of Development", Jun. 7 and 8, 2018, Economic and Social Development: Book of Proceedings: 197-203, Nov. 17, 2021.
Non-Final Office Action for U.S. Appl. No. 16/879,728 dated Dec. 9, 2021.

* cited by examiner

```
┌─────────────────────────────────────────────────────────┐
│ Determining a transaction amount to be remitted from a  │
│ remitter's blockchain account into a receiver's         │
│ blockchain account, wherein a commitment of the         │
│ remitter's balance is recorded with the remitter's      │
│ blockchain account in a blockchain, a commitment of the │
│ receiver's balance is recorded with the receiver's      │
│ blockchain account in the blockchain, the commitment    │   ~ 102
│ of the remitter's balance is calculated by using a      │
│ homomorphic encryption algorithm according to the       │
│ remitter's balance, and the commitment of the           │
│ receiver's balance is calculated by using the           │
│ homomorphic encryption algorithm according to the       │
│ receiver's balance                                      │
└─────────────────────────────────────────────────────────┘
                              │
                              ▼
┌─────────────────────────────────────────────────────────┐
│ Obtaining a commitment of the transaction amount by     │
│ using the homomorphic encryption algorithm according    │   ~ 104
│ to the transaction amount                               │
└─────────────────────────────────────────────────────────┘
                              │
                              ▼
┌─────────────────────────────────────────────────────────┐
│ Submitting to the blockchain a transaction comprising   │
│ information of the remitter's blockchain account,       │
│ information of the receiver's blockchain account, and   │
│ the commitment of the transaction amount, for the       │
│ commitment of the transaction amount to be deducted     │   ~ 106
│ from the commitment of the remitter's balance and the   │
│ commitment of the transaction amount to be added to     │
│ the commitment of the receiver's balance after the      │
│ transaction is implemented by the blockchain            │
└─────────────────────────────────────────────────────────┘
```

METHOD, APPARATUS AND ELECTRONIC DEVICE FOR BLOCKCHAIN TRANSACTIONS

CROSS REFERENCE TO RELATED APPLICATION

The present application is based on and claims priority to Chinese Patent Application No. 201810886845.3, filed on Aug. 6, 2018, which is incorporated herein by reference in its entirety.

TECHNICAL FIELD

One or more embodiments of the present specification relate to the technical field of blockchain, particularly to a method, apparatus, and electronic device for implementing blockchain-based transactions.

BACKGROUND

Blockchain nodes of a blockchain network may jointly maintain a unified blockchain ledger through a consensus reached among the blockchain nodes, to record data of transactions having occurred on the blockchain network. The blockchain ledger can be made public for viewing and verification of historical data of the occurred transactions at any time.

SUMMARY

One or more embodiments of the present specification provide a method, apparatus, and non-transitory computer-readable storage medium for implementing blockchain-based transactions.

According to a first aspect of one or more embodiments of the present specification, a method for implementing blockchain-based transactions is provided. The method may comprise: determining a transaction amount to be remitted from a remitter's blockchain account into a receiver's blockchain account, wherein a commitment of the remitter's balance is recorded with the remitter's blockchain account in a blockchain, a commitment of the receiver's balance is recorded with the receiver's blockchain account in the blockchain, the commitment of the remitter's balance is calculated by using a homomorphic encryption algorithm according to the remitter's balance, and the commitment of the receiver's balance is calculated by using the homomorphic encryption algorithm according to the receiver's balance; obtaining a commitment of the transaction amount by using the homomorphic encryption algorithm according to the transaction amount; and submitting to the blockchain a transaction comprising information of the remitter's blockchain account, information of the receiver's blockchain account, and the commitment of the transaction amount, for the commitment of the transaction amount to be deducted from the commitment of the remitter's balance and the commitment of the transaction amount to be added to the commitment of the receiver's balance after the transaction is implemented by the blockchain.

In some embodiments, the commitment of the receiver's balance is calculated by using the homomorphic encryption algorithm according to the receiver's balance and a first random number; the commitment of the transaction amount is calculated by using the homomorphic encryption algorithm according to the transaction amount and a transaction random number; the computing device is associated with the remitter; before submitting the transaction, the method further comprises sending the transaction random number to another computing device associated with the receiver via an off-chain channel for the computing device associated with the receiver to determine an updated receiver's balance according to an updated commitment of the receiver's balance and an updated first random number; the updated commitment of the receiver's balance is a sum of the commitment of the transaction amount and the commitment of the receiver's balance; the updated first random number is a sum of the transaction random number and the first random number; and the updated receiver's balance is a sum of the receiver's balance and the transaction amount.

In some embodiments, before submitting the transaction, the method may further comprise: sending the commitment of the transaction amount to the computing device associated with the receiver via the off-chain channel for the computing device associated with the receiver to verify an association among the commitment of the transaction amount, the transaction random number, and the transaction amount.

In some embodiments, before submitting the transaction, the method may further comprise: obtaining a receiver signature generated by the computing device associated with the receiver based on a receiver private key and related to the commitment of the transaction amount, wherein the receiver signature is generated after the association has been verified; and adding the receiver signature to the transaction for the blockchain nodes in the blockchain to verify the receiver signature.

In some embodiments, before submitting the transaction, the method may further comprise: generating a remitter signature related to the commitment of the transaction amount based on a remitter private key; and adding the remitter signature to the transaction for the blockchain nodes in the blockchain to verify the remitter signature.

In some embodiments, the commitment of the remitter's balance is calculated by using the homomorphic encryption algorithm according to the remitter's balance and a second random number; the commitment of the transaction amount is calculated by using the homomorphic encryption algorithm according to the transaction amount and a transaction random number; for the blockchain to implement the transaction, the transaction amount is deducted from the remitter's balance; and the transaction random number is deducted from the second random number after the transaction is implemented.

In some embodiments, before submitting the transaction, the method may further comprise: generating a range proof according to the second random number, the remitter's balance, the commitment of the remitter's balance, the transaction random number, the transaction amount, and the commitment of the transaction amount; and adding the range proof to the transaction for the blockchain nodes in the blockchain to verify whether the transaction amount is not less than zero and not more than the remitter's balance.

According to a second aspect of one or more embodiments of the present specification, an apparatus for implementing blockchain-based transactions is provided. The apparatus may comprise: one or more processors and one or more non-transitory computer-readable memories coupled to the one or more processors and configured with instructions executable by the one or more processors to cause the system to perform operations comprising: determining a transaction amount to be remitted from a remitter's blockchain account into a receiver's blockchain account, wherein a commitment of the remitter's balance is recorded with the remitter's blockchain account in a blockchain, a commitment of the receiver's balance is recorded with the receiver's blockchain account in the blockchain, the commitment of the remitter's balance is calculated by using a homomorphic encryption algorithm according to the remitter's balance, and the commitment of the receiver's balance is calculated by using the homomorphic encryption algorithm according to the receiver's balance; obtaining a commitment of the transaction amount by using the homomorphic encryption algorithm according to the transaction amount; and submitting to the blockchain a transaction comprising information of the remitter's blockchain account, information of the receiver's blockchain account, and the commitment of the transaction amount, for the commitment of the transaction amount to be deducted from the commitment of the remitter's balance and the commitment of the transaction amount to be added to the commitment of the receiver's balance after the transaction is implemented by the blockchain.

According to a third aspect of one or more embodiments of the present specification, a non-transitory computer-readable storage medium is provided. The non-transitory computer-readable storage medium may be configured with instructions executable by one or more processors to cause the one or more processors to perform operations comprising: determining a transaction amount to be remitted from a remitter's blockchain account into a receiver's blockchain account, wherein a commitment of the remitter's balance is recorded with the remitter's blockchain account in a blockchain, a commitment of the receiver's balance is recorded with the receiver's blockchain account in the blockchain, the commitment of the remitter's balance is calculated by using a homomorphic encryption algorithm according to the remitter's balance, and the commitment of the receiver's balance is calculated by using the homomorphic encryption algorithm according to the receiver's balance; obtaining a commitment of the transaction amount by using the homomorphic encryption algorithm according to the transaction amount; and submitting to the blockchain a transaction comprising information of the remitter's blockchain account, information of the receiver's blockchain account, and the commitment of the transaction amount, for the commitment of the transaction amount to be deducted from the commitment of the remitter's balance and the commitment of the transaction amount to be added to the commitment of the receiver's balance after the transaction is implemented by the blockchain.

DETAILED DESCRIPTION

Embodiments will be described in detail, with examples shown in the accompanying drawings. When the description below involves the accompanying drawings, unless otherwise indicated, the same numeral in different accompanying drawings stands for the same element or similar elements. The implementation manners described in the following embodiments do not represent all the implementation manners consistent with the present specification. Rather, they are only examples of the apparatuses and methods described in detail in the attached claims and consistent with some aspects of one or more embodiments of the present specification.

In some embodiments, it is not necessary to perform steps in the methods according to the sequence illustrated and described in the present specification. In some other embodiments, the steps of the methods may be more or less than those described in the present specification. Further, a single step described in the present specification may be split into multiple steps for description in other embodiments, while multiple steps described in the present specification may be merged into one single step for description in yet other embodiments.

Figure 1:
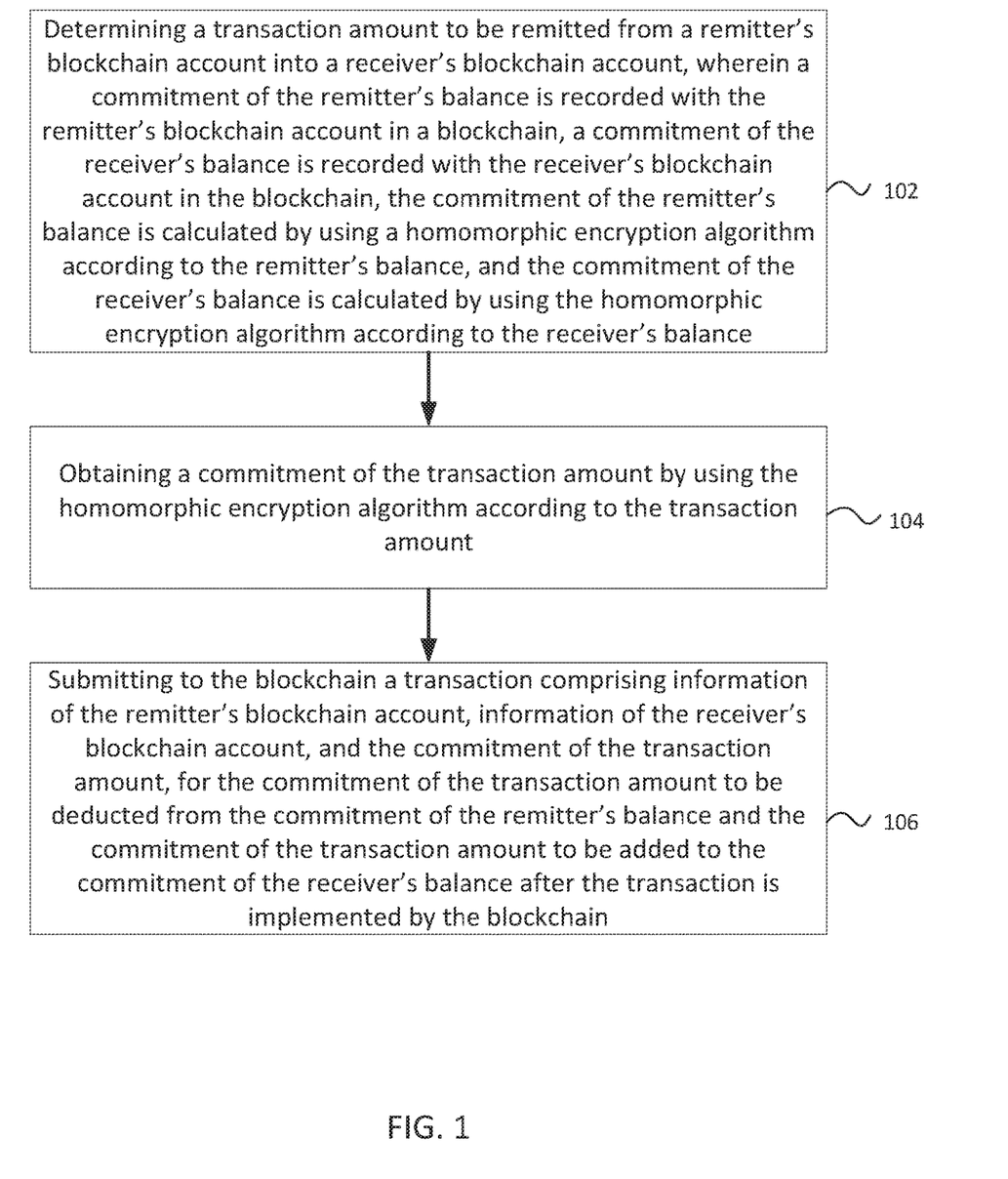
FIG. 1 is a flow chart of a method for implementing blockchain-based transactions according to some embodiments of the specification.

FIG. 1 is a flow chart of a method for implementing blockchain-based transactions according to some embodiments of the specification. As shown in FIG. 1, this method is implementable by one or more computing devices as one or more remitter devices and may comprise the following steps 102-106.

Step 102, determining a transaction amount to be remitted from a remitter's blockchain account into a receiver's blockchain account, wherein a commitment of the remitter's balance is recorded with the remitter's blockchain account in a blockchain, a commitment of the receiver's balance is recorded with the receiver's blockchain account in the blockchain, the commitment of the remitter's balance is calculated by using a homomorphic encryption algorithm according to the remitter's balance, and the commitment of the receiver's balance is calculated by using the homomorphic encryption algorithm according to the receiver's balance.

In some embodiments, the remitter's balance refers to a balance of the remitter's blockchain account in the blockchain. Similarly, the receiver's balance refers to a balance of the receiver's blockchain account in the blockchain. Therefore, a balance of an account may also be referred to as an account balance hereinafter.

In some embodiments, a remitter user may negotiate with a receiver user to determine a transaction amount. A remitter user may be associated with a remitter device (e.g., a computing device associated with the remitter user), and a receiver user may be associated with a receiver device (a computing device associated with the receiver user). The computing device may be a personal computer, a laptop computer, a cell phone, a camera phone, a smart phone, a PDA (personal digital assistant), a media player, a navigation device, an email sending and receiving device, a game console, a tablet computer, a wearable device or any combination of a few of these devices. A blockchain-based transaction between the remitter device and the receiver devices can be performed by remitting (or transferring) an asset certificate corresponding to the transaction amount from a remitter blockchain account to a receiver blockchain account. The asset certificate may correspond to a token, a digital asset, or any other intelligent asset in a blockchain. Alternatively, the asset certificate may also correspond to cash, security, a discount coupon, a real estate, and any other off-chain asset. This is not limited by embodiments of the present specification.

In some embodiments, the blockchain nodes in a blockchain may respectively maintain unified blockchain ledgers based on a consensus, so by registering the commitment of the remitter's balance and the commitment of the receiver's balance in the blockchain, the blockchain ledgers maintained by the blockchain nodes may record the commitment of the remitter's balance and the commitment of the receiver's balance, and may not record the remitter's balance and the receiver's balance. As a result, the balance held by the remitter user and the balance held by the receiver user are concealed from the public as private data.

Step 104, obtaining a commitment of the transaction amount by using the homomorphic encryption algorithm according to the transaction amount.

In some embodiments, the commitment of the transaction amount can be calculated based on the transaction amount by using the homomorphic encryption algorithm. In some embodiments, any type of homomorphic encryption algorithm may be adopted. For example, any homomorphic encryption algorithm satisfying additive homomorphism and supporting proof that plaintext data belongs to a range may be used. The homomorphic encryption algorithm may allow the commitment of the transaction amount to be deducted from the commitment of the remitter's balance and the commitment of the transaction amount to be added to the commitment of the receiver's balance, and allow the remitter to provide a proof that the transaction amount is not less than zero and not more than the remitter's account balance. The present specification has no limitation on whether the homomorphic encryption algorithm is an additively homomorphic encryption algorithm or a fully homomorphic encryption algorithm.

In some embodiments, the homomorphic encryption algorithm may generate a random number, so that corresponding commitment data can be calculated based on the random number and unencrypted data. The random number can be used to decrypt the commitment data to obtain unencrypted data, or to verify whether the commitment data corresponds to the unencrypted data. For example, the homomorphic encryption algorithm may be a Pedersen commitment mechanism.

In some embodiments, the commitment of the receiver's balance is calculated by using the homomorphic encryption algorithm according to the receiver's balance and a receiver random number. The commitment of the transaction amount is calculated by using the homomorphic encryption algorithm according to the transaction amount and a transaction random number. Accordingly, a remitter device may send the transaction random number to the receiver device via an off-chain channel so that the receiver device determines an updated receiver's balance according to an updated commitment of the receiver's balance and an updated receiver random number. The updated commitment of the receiver's balance is obtained by adding the commitment of the transaction amount to the commitment of the receiver's balance. The updated receiver random number is obtained by adding the transaction random number to the receiver random number. The updated receiver's balance is the sum of the receiver's balance and the transaction amount. In some embodiments, a receiver random number may refer to a random number used for generating the commitment of the receiver's balance based on the homomorphic encryption algorithm. Similarly, a transaction random number may refer to a random number used for generating the commitment of the transaction amount based on the homomorphic encryption algorithm.

In some embodiments, a remitter device may send the commitment of the transaction amount to a receiver device via an off-chain channel before submitting the transaction so that the receiver device verifies the association among the commitment of the transaction amount, the transaction random number, and the transaction amount. A receiver device may allow the implementation of the transaction after successful verification, otherwise may stop the implementation of the transaction. For example, a receiver device may provide a receiver signature after successful verification, and otherwise may not provide this receiver signature.

In some embodiments, a remitter device may obtain a receiver signature generated by a receiver device based on a receiver private key and is related to the commitment of a transaction amount. The receiver signature is generated by the receiver device after the above-described associations have been verified, and then added to the transaction so that the blockchain nodes in the blockchain can conduct signature verification to verify the receiver signature. For example, when a transaction does not contain the receiver signature, the blockchain nodes may determine that consensus fails, thereby refusing to proceed with the transaction.

In some embodiments, the commitment of the remitter's balance may be calculated by using the homomorphic encryption algorithm according to the remitter's balance and a remitter random number, and the commitment of the transaction amount may be calculated by using the homomorphic encryption algorithm according to the transaction amount and a transaction random number. The transaction amount is deducted from the remitter's balance and the transaction random number is deducted from the remitter random number after the transaction is implemented. Subsequent transactions may be executed based on the updated remitter's balance obtained after the transaction amount is deducted and the updated remitter random number obtained after the transaction random number is deducted. In some embodiments, a remitter random number may refer to a random number used for generating the commitment of the remitter's balance.

In some embodiments, a remitter device may generate a range proof according to the remitter random number, the remitter's balance, the commitment of the remitter's balance, the transaction random number, the transaction amount, and the commitment of the transaction amount, and add the range proof to the transaction so that the blockchain nodes in the blockchain can verify whether the transaction amount is not less than zero and not more than the remitter's balance. For instance, range proof technologies such as a Bulletproofs solution or a Borromean ring signature solution may be used.

In some embodiments, a remitter device may generate a remitter signature related to the commitment of a transaction amount via a remitter private key, and add the remitter signature to the transaction so that the blockchain nodes in the blockchain can conduct signature verification to verify the remitter signature. For example, when a transaction does not contain a remitter signature, the blockchain nodes may determine that consensus fails, and may not proceed with the transaction. In other embodiments, the remitter signature may further be related to a range proof.

Step 106, submitting to the blockchain a transaction comprising information of the remitter's blockchain account, information of the receiver's blockchain account, and the commitment of the transaction amount, for the commitment of the transaction amount to be deducted from the commitment of the remitter's balance and the commitment of the transaction amount to be added to the commitment of the receiver's balance after the transaction is implemented by the blockchain.

In some embodiments, a commitment of the transaction amount is used in a transaction, so that the blockchain ledgers may record the commitment of the transaction amount, instead of the underlying transaction amount, thereby concealing and keeping confidential the value of the transaction amount. In addition, a commitment of the remitter's balance, a commitment of the receiver's balance, and a commitment of the transaction amount are generated by using a homomorphic encryption algorithm. As a result, even without acquiring the remitter's balance, the receiver's balance, and the transaction amount, the transaction can be carried out, as deduction operations can be performed between the commitment of the remitter's balance and the commitment of the transaction amount, and addition operations can be performed between the commitment of the receiver's balance and the commitment of the transaction amount. Thus, the transaction can be implemented smoothly without disclosing private data.

In some embodiments, after blockchain nodes receive the foregoing transaction, the blockchain nodes may use double-spending prevention mechanism or replay attack prevention mechanism to verify if this transaction has been executed. If this transaction has been executed, another execution of this transaction may be rejected.

Figure 2:
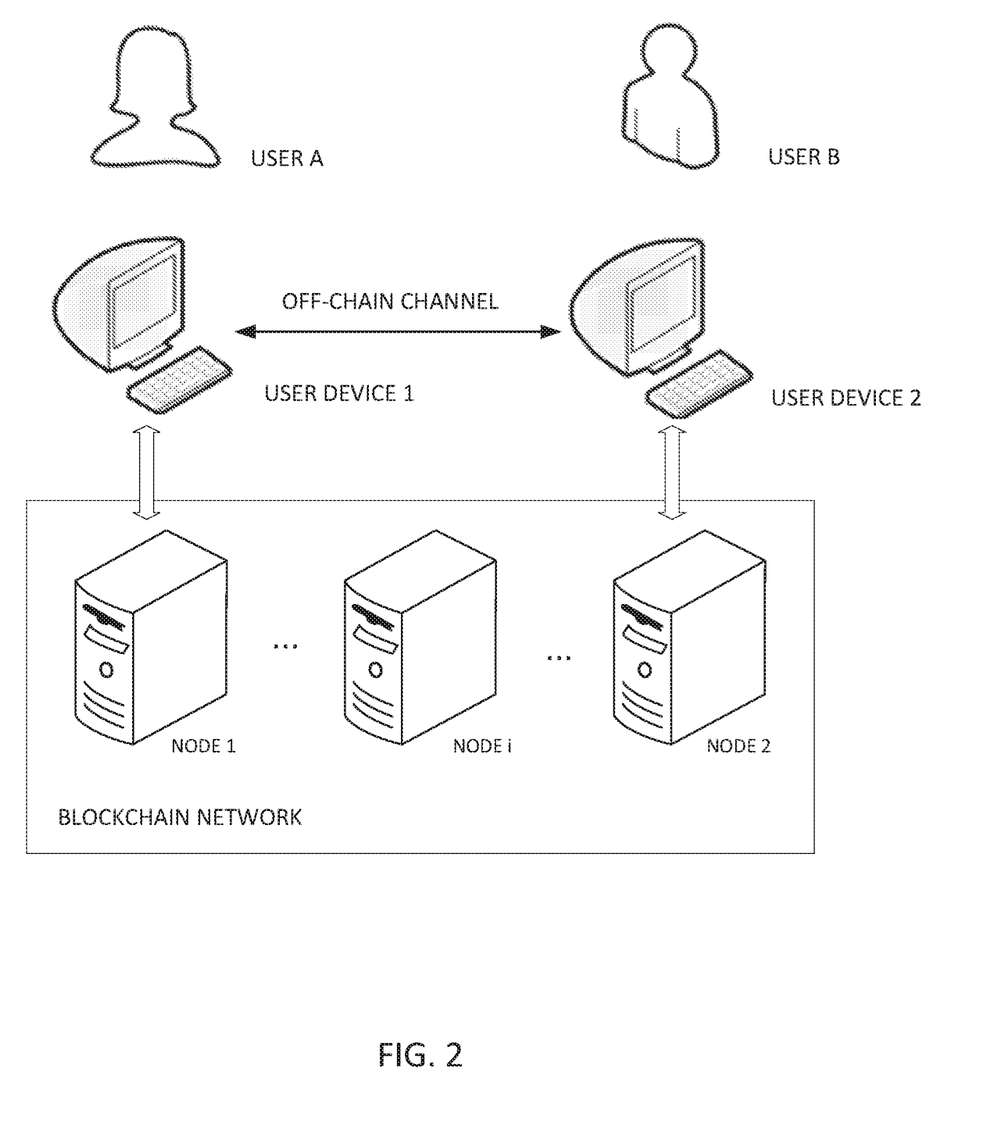
FIG. 2 is a schematic diagram of an implementation of a remittance transaction in a blockchain network according to some embodiments of the specification.

For easier understanding, a remittance transaction in a blockchain network is taken below as an example to describe the technical solutions of the present specification in detail. FIG. 2 is a schematic diagram of implementation of a remittance transaction in a blockchain network according to some embodiments of the specification. As shown in FIG. 2, it is assumed that a user A conducts blockchain remittance to a user B. A "user" in the present specification may be manifested as a logged-in user account, while this user account may belong to an individual or an organization.

It is assumed that a remitter device used by the user A is a user device 1. For instance, a user account corresponding to the user A is logged in on this user device 1. Similarly, a receiver device used by the user B is a user device 2. An off-chain channel may be established between the user device 1 and the user device 2 to achieve corresponding off-chain communications.

A client program of blockchain may be run on the user device 1 so that the user device 1 communicates with a corresponding blockchain node in the blockchain network, such as the node 1 shown in FIG. 2. Similarly, a client program of blockchain may be run on the user device 2 so that the user device 2 also communicates with a corresponding blockchain node in the blockchain network, such as the node 2 shown in FIG. 2. The blockchain network also includes other blockchain nodes, such as the node i shown in FIG. 2. The blockchain nodes are not enumerated here. Through the foregoing node 1, node 2, etc., the remittance transaction between the user A and the user B may be implemented via the blockchain network, and related transaction information may be recorded in the blockchain ledgers maintained by the blockchain nodes respectively, thereby preventing the recorded transaction information from being tampered with, and also facilitating subsequent inspection.

Figure 3:
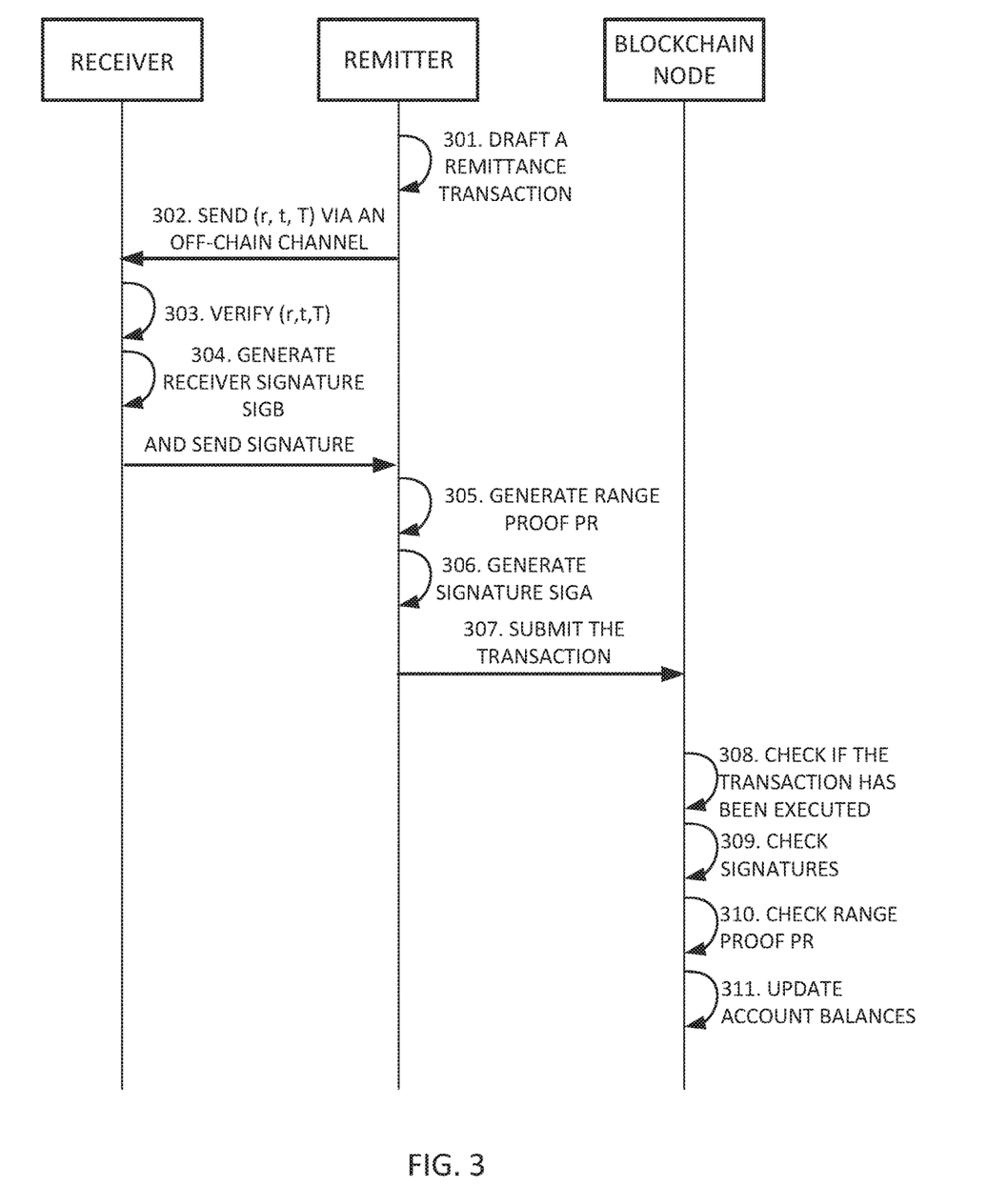
FIG. 3 is a flow chart of an implementation of a remittance transaction in a blockchain network according to some embodiments of the specification.

With respect to the scenario of the remittance transaction shown in FIG. 2, FIG. 3 is a flow chart of implementation of a remittance transaction in a blockchain network according to some embodiments of the specification. As shown in FIG. 3, the process of interaction among the remitter, receiver, and blockchain nodes may comprise the following steps 301-311.

Step 301, the remitter drafts a remittance transaction.

In some embodiments, a remitter may refer to an individual or entity that remits a fund or other resources in a remittance transaction; correspondingly, a receiver may refer to an individual or entity that receives a fund or other resources in the remittance transaction. For example, in the embodiments shown in FIG. 2, the user device 1 may be configured to be the remitter, while the user device 2 may be configured to be the receiver.

In some embodiments, when drafting a remittance transaction, a remitter may negotiate a remittance amount t with a receiver. The remitter may apply homomorphic encryption to the remittance amount t based on a Pedersen commitment mechanism. The remitter may generate a remittance random number r for the remittance amount t, and the remittance commitment corresponding to the remittance amount t is $T=Comm(r, t)=g^r h^t$, where, g and h are known parameters in the algorithm.

Step 302, the remitter sends (r, t, T) to a receiver via an off-chain channel.

In some embodiments, sending (r, t, T) via an off-chain channel rather than a blockchain network may avoid recording the remittance random number r and the remittance amount t in a blockchain ledger, and ensure that the remittance amount t is unknown except to the remitter and the receiver.

Step 303, the receiver verifies the received (r, t, T).

In some embodiments, the receiver may verify the remittance amount t to determine that it is the negotiated remittance amount. In some embodiments, if the remittance amount t is correct, the receiver may verify the remittance commitment T; in other words, the receiver may calculate the remittance random number r and the remittance amount t via the encryption algorithm based on a Perdersen commitment mechanism to verify if the remittance commitment T=Comm(r, t) is correct. If yes, the verification is passed. If no, the verification is not passed.

Step 304, after the verification is passed, a receiver signature is generated and returned to the remitter.

In some embodiments, after the verification is passed, the receiver may use a receiver private key to sign (A, B, T), generate a signature SIGB, and return the signature to the remitter. This signature SIGB indicates that the receiver agrees that the remittance transaction with a commitment T is to be implemented from the blockchain account 1 of the user A to the blockchain account 2 of user B.

Step 305, after receiving the signature SIGB, the remitter generates a range proof PR.

In some embodiments, after the remitter receives the signature SIGB, the remitter determines that the receiver allows implementation of the remittance transaction. The remitter conducts the remittance transaction to the receiver. The remittance operation from the blockchain account 1 corresponding to the user A to the blockchain account 2 corresponding to the user B may be executed. In some embodiments, the balance $s_A$ in the blockchain account 1 and the balance $s_B$ in the blockchain account 2 may be recorded in the blockchain ledgers maintained by various blockchain nodes. In other embodiments, instead of directly recording the balances, a balance commitment $S_A$ corresponding to the account balance $s_A$ and a balance commitment $S_B$ corresponding to the account balance $s_B$ may be recorded for privacy protection. The balance commitment $S_A=Comm(r_A,$ $s_A$), the balance commitment $S_B$=Comm($r_B$, $s_B$), $r_A$ is a random number corresponding to $s_A$, and $r_B$ is a random number corresponding to $s_B$.

In some embodiments, to ensure a smooth completion of the remittance transaction, blockchain nodes may determine that the values of the remittance amount t and the account balance $s_A$ meet the following conditions: t≥0 and $s_A$-t≥0; while range proof technologies enable the blockchain nodes to verify whether the transaction meets the predetermined conditions. For example, the Bulletproofs solution or the Borromean ring signature solution may be used to achieve this. Other solutions may also be used. The remitter may use a range proof technology to generate a corresponding range proof PR related to ($r_A$, $s_A$, $S_A$, r, t, T) so as to enable the blockchain nodes to verify if the conditions of t≥0 and $s_A$-t≥0 are met in the subsequent process.

Step 306, the remitter signs the transaction (A, B, T; PR) to generate a signature SIGA.

In some embodiments, the remitter may generate the signature SIGA by signing the transaction (A, B, T; PR) based on a remitter private key.

Step 307, the remitter submits the transaction to the blockchain.

In some embodiments, the remitter may submit the corresponding remittance transaction (A, B, T; PR; SIGA, SIGB) to the blockchain via a node 1 to execute this remittance transaction. The remittance transaction (A, B, T; PR; SIGA, SIGB) may be transmitted to all the blockchain nodes in the blockchain network and all the blockchain nodes may verify this remittance transaction (A, B, T; PR; SIGA, SIGB) respectively and execute a remittance operation when the verification is passed, or to reject the remittance when the verification is not passed.

Step 308, the blockchain nodes check if the transaction has been executed.

In some embodiments, every blockchain node in the blockchain network may receive the remittance transaction (A, B, T; PR; SIGA, SIGB), and perform verification and other operations through Steps 308-311.

In some embodiments, after the blockchain nodes receive the remittance transaction (A, B, T; PR; SIGA, SIGB), the blockchain nodes may use the double-spending prevention mechanism or replay attack prevention mechanism to verify if this remittance transaction has been executed. If this remittance transaction has been executed, another execution of this remittance transaction (A, B, T; PR; SIGA, SIGB) may be rejected, otherwise the process proceeds to Step 309.

Step 309, the blockchain nodes check the signatures.

In some embodiments, the blockchain nodes may check if the signatures SIGA and SIGB contained in the remittance transaction (A, B, T; PR; SIGA, SIGB) are correct. If any of the signatures is not correct, the execution of this remittance transaction (A, B, T; PR; SIGA, SIGB) may be rejected, otherwise the process proceeds to Step 310.

Step 310, the blockchain nodes check the range proof PR.

In some embodiments, the blockchain nodes may, based on a range proof technology, check the range proof PR contained in the remittance transaction (A, B, T; PR; SIGA, SIGB) to determine if the conditions of t≥0 and $s_A$-t≥0 are met. If the conditions are not met, the execution of this remittance transaction (A, B, T; PR; SIGA, SIGB) may be rejected, otherwise the process proceeds to Step 311.

Step 311, in the maintained blockchain ledgers, the blockchain nodes update the balances in the blockchain accounts of the user A and the user B.

In some embodiments, after the verification in Steps 308-310 is passed, the blockchain nodes may deduct the remittance commitment T from the balance commitment $S_A$ corresponding to the account balance $s_A$ recorded in the blockchain ledgers, and add the remittance commitment T to the balance commitment $S_B$ corresponding to the account balance $s_B$, so that the balance commitment in the blockchain account 1 corresponding to the user A is updated to $S_A$-T, and the balance commitment in the blockchain account 2 corresponding to the user B is updated to $S_B$+T.

Based on the properties of the homomorphic encryption algorithm, the updated balance commitment $S_A$-T follows $S_A$-T=Comm($r_A$-r, $s_A$-t), because the balance commitment $S_A$=Comm($r_A$, $s_A$) and T=Comm(r, t). The user device 1 knows $r_A$-r and can acquire $S_A$-T from the blockchain ledger maintained by the node 1, and $s_A$-t can then be determined. Similarly, the updated balance commitment $S_B$+T follows $S_B$+T=Comm($r_B$+r, $s_B$+t), because the balance commitment $S_B$=Comm($r_B$, $s_B$) and T=Comm(r, t). The user device 2 knows $r_B$, has been notified of the transaction random number r by the remitter in Step 302, and can acquire $S_B$+T from the blockchain ledger maintained by the node 2, and $s_B$+t can then be determined.

To sum up, the use of the homomorphic encryption mechanism allows the encryption of the balances in blockchain accounts. After encryption, the balance commitments can be recorded in blockchain ledgers. The remittance amounts can also be encrypted, and the remittance commitments can then be used in the implementation of remittance transactions. Therefore, the remittance transactions can be successfully implemented via the blockchain network, while keeping the account balance and remittance amount confidential, without affecting the blockchain nodes' verification for transaction conditions, and enabling the blockchain network to have privacy protection function.

Figure 4:
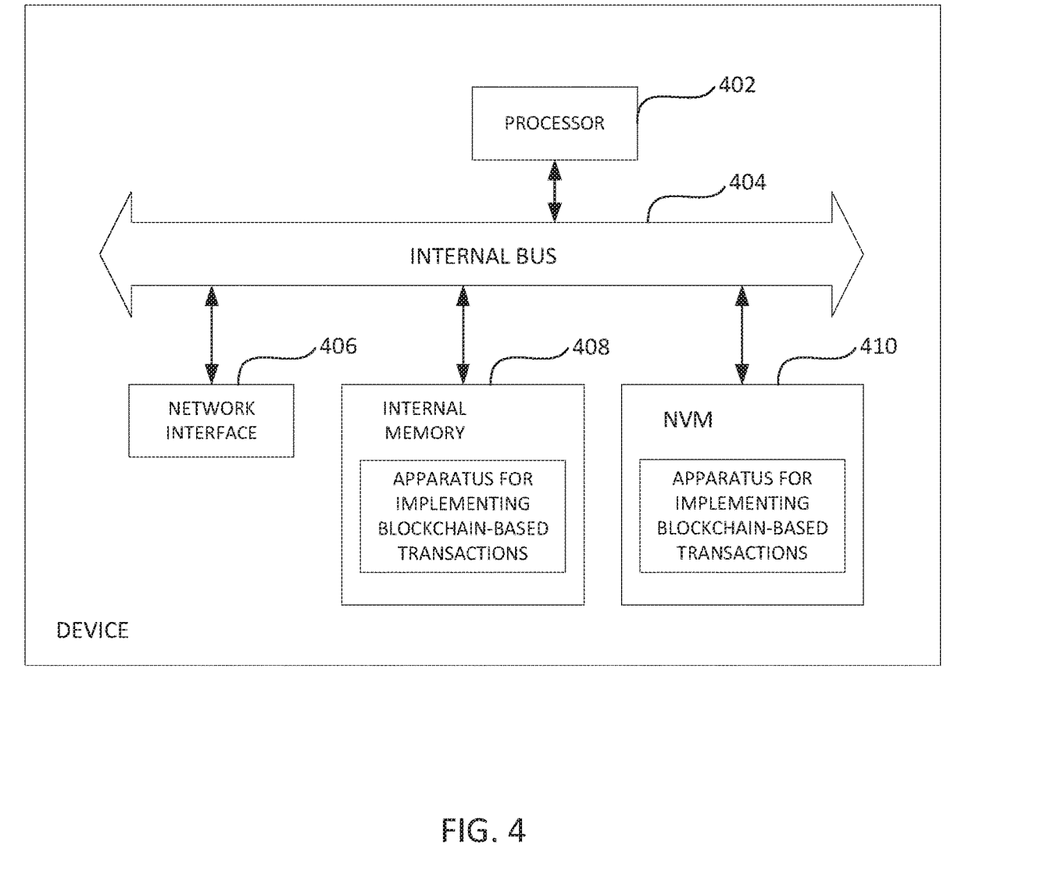
FIG. 4 is a structure diagram of a device for implementing blockchain-based transactions according to some embodiments of the specification.

FIG. 4 is a structure diagram of a device according to some embodiments of the specification. As shown in FIG. 4, at the level of hardware, the device comprises a processor 402, an internal bus 404, a network interface 406, an internal memory 408 and a non-volatile memory (NVM) 410. The device may further comprise other pieces of hardware. In some embodiments, the processor 402 reads corresponding computer programs from the NVM 410 to the internal memory 408 and then executes the computer programs to form a apparatus at a logical level for implementing blockchain transactions. In addition to the software implementation manner, one or more embodiments of the present specification do not exclude other implementation manners, such as a logic device or a combination of software and hardware. That is, the executive bodies of the following processing flow are not limited to logical units and may be hardware or logic devices.

Figure 5:
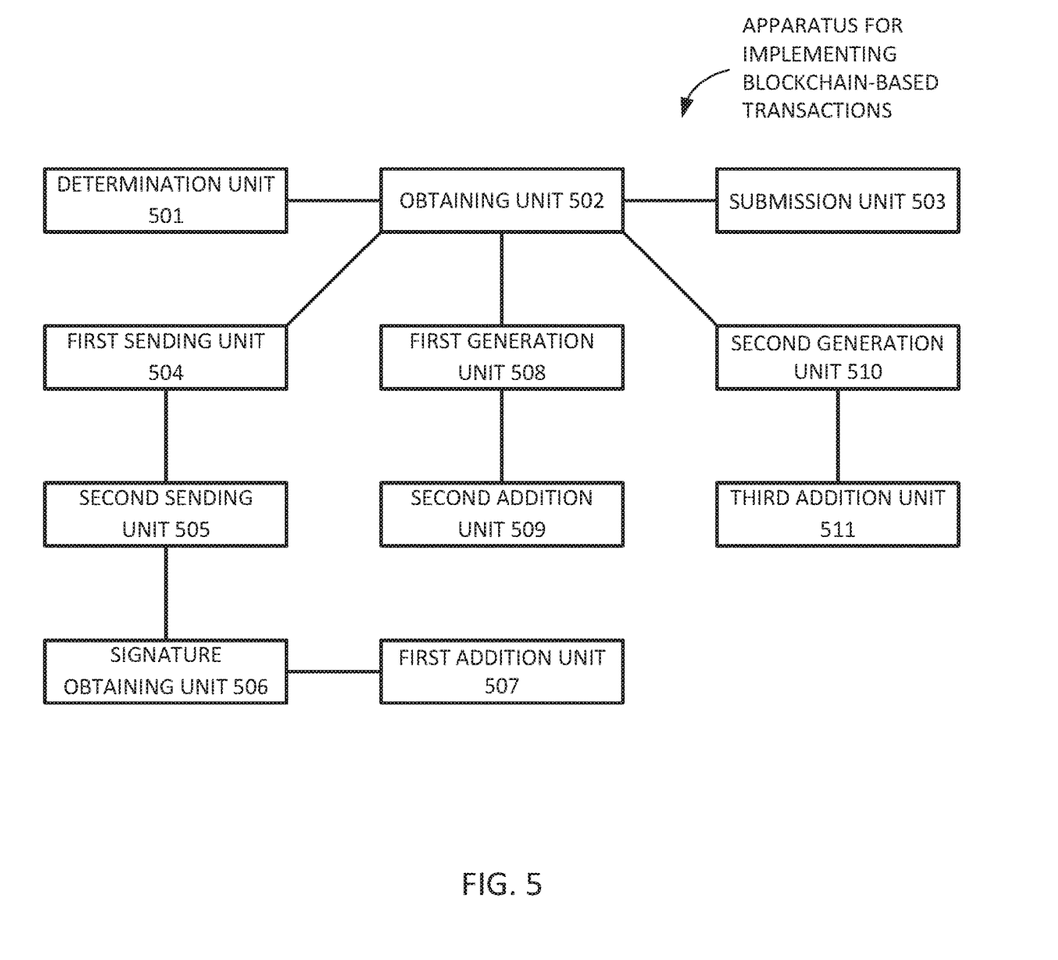
FIG. 5 is a block diagram of an apparatus for implementing blockchain-based transactions according to some embodiments of the specification.

Referring to FIG. 5, a block diagram of an apparatus for implementing blockchain-based transactions is provided according to some embodiments of the specification. In the software implementation manner, the apparatus for implementing blockchain-based transactions is implementable by a computing device such as remitter device and may comprise: a determination unit 501 for determining a transaction amount to be remitted from a remitter's blockchain account into a receiver's blockchain account, wherein a commitment of the remitter's balance is recorded with the remitter's blockchain account in the blockchain, a commitment of the receiver's balance is recorded with the receiver's blockchain account in the blockchain, the commitment of the remitter's balance is calculated by using a homomorphic encryption algorithm according to a remitter's balance, and the commitment of the receiver's balance is calculated by using the homomorphic encryption algorithm according to a receiver's balance; an obtaining unit 502 for obtaining a commitment of the transaction amount which is calculated by using the homomorphic encryption algorithm according to the transaction amount; and a submission unit 503 for submitting a transaction to the blockchain, wherein the transaction comprises the information of the remitter's blockchain account, the information of the receiver's blockchain account and the commitment of the transaction amount, for the commitment of the transaction amount to be deducted from the commitment of the remitter's balance after the transaction is implemented and the commitment of the transaction amount to be added to the commitment of the receiver's balance after the transaction is implemented.

Alternatively, the commitment of the receiver's balance is calculated by using the homomorphic encryption algorithm according to the receiver's balance and a receiver random number, and the commitment of the transaction amount is calculated by using the homomorphic encryption algorithm according to the transaction amount and a transaction random number; the apparatus further comprises: a first sending unit 504 for sending the transaction random number to the receiver device via an off-chain channel for the receiver device to determine an updated receiver's balance according to an updated commitment of the receiver's balance and an updated receiver random number; wherein the updated commitment of the receiver's balance is obtained by adding the commitment of the transaction amount to the commitment of the receiver's balance, the updated receiver random number is obtained by adding the transaction random number to the receiver random number, and the updated receiver's balance is the sum of the receiver's balance and the transaction amount.

In some embodiments, the apparatus further comprises: a second sending unit 505 for sending the commitment of the transaction amount to the receiver device via an off-chain channel before submission of the transaction for the receiver device to verify association among the commitment of the transaction amount, the transaction random number and the transaction amount.

In some embodiments, the apparatus further comprises: a signature obtaining unit 506 for obtaining a receiver signature that is generated by the receiver device via a receiver private key and is related to the commitment of the transaction amount, wherein the receiver signature is generated after the associations have been verified; and a first addition unit 507 for adding the receiver signature to the transaction for the blockchain nodes in the blockchain to verify the receiver signature.

In some embodiments, the apparatus further comprises: a first generation unit 508 for generating a remitter signature related to the commitment of the transaction amount via a remitter private key; and a second addition unit 509 for adding the remitter signature to the transaction for the blockchain nodes in the blockchain to verify the remitter signature.

Alternatively, the commitment of the remitter's balance is calculated by using the homomorphic encryption algorithm according to the remitter's balance and a remitter random number, and the commitment of the transaction amount is calculated by using the homomorphic encryption algorithm according to the transaction amount and a transaction random number, wherein the transaction amount is deducted from the remitter's balance after the transaction is implemented, and the transaction random number is deducted from the remitter random number after the transaction is implemented.

In some embodiments, the apparatus further comprises: a second generation unit 510 for generating a range proof according to the remitter random number, the remitter's balance, the commitment of the remitter's balance, the transaction random number, the transaction amount and the commitment of the transaction amount; and a third addition unit 511 for adding the range proof to the transaction for the blockchain nodes in the blockchain to verify whether the transaction amount meets that: the transaction amount is not less than zero and not more than the remitter's balance.

The systems, apparatuses, modules or units illustrated in the foregoing embodiments may be implemented by computer chips or entities, or by products with certain functions. A typical device is a computer. An example of the computer may be a personal computer, a laptop computer, a cell phone, a camera phone, a smart phone, a PDA (personal digital assistant), a media player, a navigation device, an email sending and receiving device, a game console, a tablet computer, a wearable device or any combination of a few of these devices.

In a typical configuration, the computer comprises one or more processors (CPU), I/O interfaces, network interfaces and internal memories.

The internal memory may be in a form of volatile memory, random access memory (RAM) and/or non-volatile memory such as read-only memory (ROM) or flash memory (flash RAM) in the computer readable media. Internal memory is an example of computer readable media.

Computer readable media include non-volatile and volatile, movable and non-movable media, and may achieve information storage by any method or technology. Information may be computer readable instructions, data structures, program modules or other data. Examples of computer storage media include, but are not limited to, phase change random access memory (PRAM), static random access memory (SRAM), dynamic random access memory (DRAM) and other types of random access memory (RAM), read only memory (ROM), electrically erasable programmable read only memory (EEPROM), flash memory or other memory technologies, compact disc-read only memory (CD-ROM), digital versatile disc (DVD) or other optical memory, cassette type magnetic tape, magnetic disk memory, quantum memory, graphene-based storage media, or other magnetic storage devices or any other non-transfer media, which may be used to store information that is accessible to computation devices. According to the specification, computer readable media do not include transitory media, such as modulated data signals and carriers.

Terms "include," "contain" or any other variants of these terms are intended to cover non-exclusive inclusion so that a process, method, commodity or device including a series of elements not only includes these elements but also includes other elements not clearly set out, or also include the elements inherent to such process, method, commodity or device. Unless otherwise with more limitations, the elements defined by "include one . . . " do not exclude that the process, method, commodity or device including the elements also have other same elements.

Embodiments of the present specification are described above. Other embodiments are in the scope of the attached claims. In some embodiments, the actions or steps recorded in the claims may be executed in a sequence different from that given in the embodiments and can still achieve the expected results. Further, it is not necessary for the process described in the accompanying drawings to require the given specific sequence or a continuous sequence to achieve the expected results. In some embodiments, multitasking processing and parallel processing are also acceptable or may be favorable.

The terms used in one or more embodiments of the present specification are only for the purpose of describing embodiments and not intended to limit one or more embodiments of the present specification. The singular forms "one," "the" and "this" used in one or more embodiments of the present specification and in the attached claims also are intended to cover plural forms unless other meanings are clearly indicated in the context. The term "and/or" used in the text refers to any or all possible combinations containing one or more the associated listed items.

Although one or more embodiments of the present specification may use terms such as first, second and third to describe various kinds of information, the information should not be limited to these terms. These terms are only intended to differentiate information of the same type. For example, without departing from the scope of one or more embodiments of the present specification, first information may also be referred to as second information, and similarly, second information may also be referred to as first information. Subject to the context, the term "if" used here may be interpreted as "at the time of . . . ," "when . . . ," or "in response to determination."

The foregoing description is not intended to limit one or more embodiments of the present specification. Any modifications, equivalent replacements and improvements made without departing from the spirit and principle of one or more embodiments of the present specification shall fall within the scope of one or more embodiments of the present specification.

What is claimed is:

1. A method for implementing blockchain-based transactions, comprising:
    calculating, by a receiver device, a commitment of a receiver's balance using a homomorphic encryption algorithm;
    recording, by the receiver device, the commitment of a receiver's balance with a receiver's blockchain account in a blockchain;
    calculating, by a remitter device, a commitment of a remitter's balance using the homomorphic encryption algorithm;
    recording, by the remitter device, the commitment of the remitter's balance with a remitter's blockchain account in the blockchain;
    obtaining, by the remitter device from a remitter user, a transaction amount to be remitted from the remitter's blockchain account into the receiver's blockchain account;
    sending, by the remitter device to the receiver device, the transaction amount via an off-chain channel that is separate from the blockchain;
    verifying, by the receiver device, the transaction amount;
    generating, by the receiver device, a receiver signature in response to the transaction amount being verified;
    sending, by the receiver device to the remitter device via the off-chain channel, the receiver signature;
    obtaining, by the remitter device, a commitment of the transaction amount using the homomorphic encryption algorithm according to the transaction amount;
    submitting, by the remitter device to one or more blockchain nodes in the blockchain, a transaction comprising information of the remitter's blockchain account, information of the receiver's blockchain account, the receiver signature, and the commitment of the transaction amount, for the commitment of the transaction amount to be deducted from the commitment of the remitter's balance and the commitment of the transaction amount to be added to the commitment of the receiver's balance;
    verifying, by the one or more blockchain nodes, the transaction submitted by the remitter device;
    in response to the transaction being verified:
        deducting, by the one or more blockchain nodes, the commitment of the transaction amount from the commitment of the remitter's balance; and
        adding, by the one or more blockchain nodes, the commitment of the transaction amount to the commitment of the receiver's balance.

2. The method as described in claim 1, wherein:
    calculating, by the receiver device, the commitment of the receiver's balance using the homomorphic encryption algorithm comprises:
        calculating, by the receiver device, the commitment of the receiver's balance using the homomorphic encryption algorithm according to the receiver's balance and a first random number;
    obtaining, by the remitter device, the commitment of the transaction amount using the homomorphic encryption algorithm comprises:
        calculating, by the remitter device, the commitment of the transaction amount using the homomorphic encryption algorithm according to the transaction amount and a transaction random number; and
    before submitting the transaction, the method further comprises:
        sending, by the remitter device, the transaction random number to the receiver device via the off-chain channel for the receiver device to determine an updated receiver's balance according to an updated commitment of the receiver's balance and an updated first random number, wherein:
            the updated commitment of the receiver's balance is a sum of the commitment of the transaction amount and the commitment of the receiver's balance;
            the updated first random number is a sum of the transaction random number and the first random number; and
            the updated receiver's balance is a sum of the receiver's balance and the transaction amount.

3. The method as described in claim 2, before submitting the transaction, further comprising:
    sending, by the remitter device, the commitment of the transaction amount to the receiver device via the off-chain channel for the receiver device to verify an association among the commitment of the transaction amount, the transaction random number, and the transaction amount.

4. The method as described in claim 3, before submitting the transaction, further comprising:
    obtaining, by the remitter device from the receiver device, the receiver signature generated by the receiver device based on a receiver private key and related to the commitment of the transaction amount, wherein the receiver signature is generated in response to the association being verified; and
    adding, by the remitter device, the receiver signature to the transaction for the one or more blockchain nodes in the blockchain to verify the receiver signature.

5. The method as described in claim 1, before submitting the transaction, further comprising:

generating, by the remitter device, a remitter signature related to the commitment of the transaction amount based on a remitter private key; and adding by the remitter device, the remitter signature to the transaction for the one or more blockchain nodes in the blockchain to verify the remitter signature.

6. The method as described in claim 1, wherein:

calculating, by the remitter device, the commitment of the remitter's balance using the homomorphic encryption algorithm comprises:
- calculating, by the remitter device, the commitment of the remitter's balance using the homomorphic encryption algorithm according to the remitter's balance and a second random number; and obtaining, by the remitter device, the commitment of the transaction amount using the homomorphic encryption algorithm comprises:
- calculating, by the remitter device, the commitment of the transaction amount using the homomorphic encryption algorithm according to the transaction amount and a transaction random number, wherein the transaction random number is deducted from the second random number.

7. The method as described in claim 6, further comprising:

generating, by the remitter device, a range proof according to the second random number, the remitter's balance, the commitment of the remitter's balance, the transaction random number, the transaction amount, and the commitment of the transaction amount;

adding, by the remitter device, the range proof to the transaction; and verifying, by the one or more blockchain nodes, whether the transaction amount is not less than zero and not more than the remitter's balance according to the range proof added to the transaction.

8. An apparatus for implementing blockchain-based transactions, comprising:

a receiver device, comprising: (i) one or more receiver device processors and (ii) one or more receiver device memories storing first computer-readable instructions that, when executed by the one or more receiver device processors, cause the one or more receiver device processors to perform operations comprising:
- calculating a commitment of a receiver's balance using a homomorphic encryption algorithm;
- recording the commitment of a receiver's balance with a receiver's blockchain account in a blockchain;
- verifying a transaction amount; and
- generating a receiver signature in response to the transaction amount being verified;

a remitter device, comprising: (i) one or more remitter device processors and (ii) one or more remitter device memories storing second computer-readable instructions that, when executed by the one or more remitter device processors, cause the one or more remitter device processors to perform operations comprising:
- calculating a commitment of a remitter's balance using the homomorphic encryption algorithm;
- recording the commitment of the remitter's balance with a remitter's blockchain account in the blockchain;
- obtaining, from a remitter user, the transaction amount, wherein the transaction amount is to be remitted from the remitter's blockchain account into the receiver's blockchain account;
- sending, to the receiver device, the transaction amount via an off-chain channel that is separate from the blockchain;
- obtaining a commitment of the transaction amount using the homomorphic encryption algorithm according to the transaction amount; and
- submitting, to the blockchain, a transaction comprising information of the remitter's blockchain account, information of the receiver's blockchain account, the receiver signature, and the commitment of the transaction amount, for the commitment of the transaction amount to be deducted from the commitment of the remitter's balance and the commitment of the transaction amount to be added to the commitment of the receiver's balance; and one or more blockchain nodes in the blockchain, wherein each of the one or more blockchain nodes in the blockchain comprises: (i) one or more blockchain node processors and (ii) one or more blockchain node memories storing third computer-readable instructions that, when executed by the one or more blockchain node processors, cause the one or more blockchain node processors to perform operations comprising:
- verifying the transaction submitted by the remitter device;
- in response to the transaction being verified:
  - deducting the commitment of the transaction amount from the commitment of the remitter's balance; and
  - adding the commitment of the transaction amount to the commitment of the receiver's balance.

9. The apparatus as described in claim 8, wherein:

the commitment of the receiver's balance is calculated by using the homomorphic encryption algorithm according to the receiver's balance and a first random number;

the commitment of the transaction amount is calculated by using the homomorphic encryption algorithm according to the transaction amount and a transaction random number;

the computing device is associated with the remitter; and before submitting the transaction, the operations performed by the one or more remitter device processors further comprise:
- sending the transaction random number to the receiver device via the off-chain channel for the receiver device to determine an updated receiver's balance according to an updated commitment of the receiver's balance and an updated first random number, wherein:
  - the updated commitment of the receiver's balance is a sum of the commitment of the transaction amount and the commitment of the receiver's balance;
  - the updated first random number is a sum of the transaction random number and the first random number; and
  - the updated receiver's balance is a sum of the receiver's balance and the transaction amount.

10. The apparatus as described in claim 9, wherein before submitting the transaction, the operations performed by the one or more remitter device processors further comprise:
- sending the commitment of the transaction amount to the receiver device via the off-chain channel for the receiver device to verify an association among the commitment of the transaction amount, the transaction random number, and the transaction amount.

11. The apparatus as described in claim 10, wherein before submitting the transaction, the operations performed by the one or more remitter device processors further comprise:
  obtaining, from the receiver device, the receiver signature generated by the receiver device based on a receiver private key and related to the commitment of the transaction amount, wherein the receiver signature is generated in response to the association being verified; and
  adding the receiver signature to the transaction for the one or more blockchain nodes in the blockchain to verify the receiver signature.

12. The apparatus as described in claim 8, wherein before submitting the transaction, the operations performed by the one or more remitter device processors further comprise:
  generating a remitter signature related to the commitment of the transaction amount based on a remitter private key; and
  adding the remitter signature to the transaction for the blockchain nodes in the blockchain to verify the remitter signature.

13. The apparatus as described in claim 8, wherein:
  the commitment of the remitter's balance is calculated by using the homomorphic encryption algorithm according to the remitter's balance and a second random number; and
  the commitment of the transaction amount is calculated by using the homomorphic encryption algorithm according to the transaction amount and a transaction random number, wherein the transaction random number is deducted from the second random number.

14. The apparatus as described in claim 13, wherein:
  the operations performed by the one or more remitter device processors further comprise:
    generating a range proof according to the second random number, the remitter's balance, the commitment of the remitter's balance, the transaction random number, the transaction amount, and the commitment of the transaction amount; and
    adding the range proof to the transaction; and
  the operations performed by the one or more blockchain node processors further comprise:
    verifying whether the transaction amount is not less than zero and not more than the remitter's balance.

15. One or more non-transitory computer-readable storage media, comprising:
  a first non-transitory computer-readable medium configured with instructions executable by one or more processors of a receiver device to cause the one or more processors of the receiver device to perform operations comprising:
    calculating a commitment of a receiver's balance using a homomorphic encryption algorithm;
    recording the commitment of a receiver's balance with a receiver's blockchain account in a blockchain;
    verifying a transaction amount; and
    generating a receiver signature in response to the transaction amount being verified;
  a second non-transitory computer-readable medium configured with instructions executable by one or more processors of a remitter device to cause the one or more processors of the remitter device to perform operations comprising:
    calculating a commitment of a remitter's balance using the homomorphic encryption algorithm;
    recording the commitment of the remitter's balance with a remitter's blockchain account in the blockchain;
    obtaining, by a remitter user, the transaction amount, wherein the transaction amount is to be remitted from the remitter's blockchain account into the receiver's blockchain account;
    sending, to the receiver device, the transaction amount via an off-chain channel that is separate from the blockchain;
    obtaining a commitment of the transaction amount using the homomorphic encryption algorithm according to the transaction amount; and
    submitting, to the blockchain, a transaction comprising information of the remitter's blockchain account, information of the receiver's blockchain account, the receiver signature, and the commitment of the transaction amount, for the commitment of the transaction amount to be deducted from the commitment of the remitter's balance and the commitment of the transaction amount to be added to the commitment of the receiver's balance; and
  a third non-transitory computer-readable medium configured with instructions executable by one or more processors of a blockchain node to cause the one or more processors of the blockchain node to perform operations comprising:
    verifying the transaction submitted by the remitter device;
    in response to the transaction being verified:
      deducting the commitment of the transaction amount from the commitment of the remitter's balance; and
      adding the commitment of the transaction amount to the commitment of the receiver's balance.

16. The one or more non-transitory computer-readable storage media as described in claim 15, wherein:
  the commitment of the receiver's balance is calculated by using the homomorphic encryption algorithm according to the receiver's balance and a first random number;
  the commitment of the transaction amount is calculated by using the homomorphic encryption algorithm according to the transaction amount and a transaction random number;
  the computing device is associated with the remitter; and
  before submitting the transaction, the operations performed by the one or more processors of the remitter device further comprise:
    sending the transaction random number to the receiver device via the off-chain channel for the receiver device to determine an updated receiver's balance according to an updated commitment of the receiver's balance and an updated first random number, wherein:
      the updated commitment of the receiver's balance is a sum of the commitment of the transaction amount and the commitment of the receiver's balance;
      the updated first random number is a sum of the transaction random number and the first random number; and
      the updated receiver's balance is a sum of the receiver's balance and the transaction amount.

17. The one or more non-transitory computer-readable storage media as described in claim 16, wherein before submitting the transaction, the operations performed by the one or more processors of the remitter device further comprise:

sending the commitment of the transaction amount to the receiver device via the off-chain channel for the receiver device to verify an association among the commitment of the transaction amount, the transaction random number, and the transaction amount.

18. The one or more non-transitory computer-readable storage media as described in claim 17, wherein before submitting the transaction, the operations performed by the one or more processors of the remitter device further comprise:

obtaining, from the receiver device, the receiver signature generated by the receiver device based on a receiver private key and related to the commitment of the transaction amount, wherein the receiver signature is generated in response to the association being verified; and adding the receiver signature to the transaction for the one or more blockchain nodes in the blockchain to verify the receiver signature.

19. The one or more non-transitory computer-readable storage media as described in claim 15, wherein before submitting the transaction, the operations performed by the one or more processors of the remitter device further comprising:

generating a remitter signature related to the commitment of the transaction amount based on a remitter private key; and adding the remitter signature to the transaction for the blockchain nodes in the blockchain to verify the remitter signature.

20. The one or more non-transitory computer-readable storage media as described in claim 15, wherein:

the commitment of the remitter's balance is calculated by using the homomorphic encryption algorithm according to the remitter's balance and a second random number; and the commitment of the transaction amount is calculated by using the homomorphic encryption algorithm according to the transaction amount and a transaction random number, wherein the transaction random number is deducted from the second random number.

* * * * *